(12) United States Patent
Wang

(10) Patent No.: US 9,110,340 B2
(45) Date of Patent: Aug. 18, 2015

(54) ARRAY SUBSTRATE, LIQUID CRYSTAL PANEL AND LIQUID CRYSTAL DISPLAY DEVICE COMPRISING PROTRUSION ELECTRODE PARTS

(75) Inventor: Zheng Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 232 days.

(21) Appl. No.: 13/699,654

(22) PCT Filed: Aug. 20, 2012

(86) PCT No.: PCT/CN2012/080376
§ 371 (c)(1),
(2), (4) Date: Nov. 23, 2012

(87) PCT Pub. No.: WO2013/026381
PCT Pub. Date: Feb. 28, 2013

(65) Prior Publication Data
US 2013/0148067 A1 Jun. 13, 2013

(30) Foreign Application Priority Data

Aug. 25, 2011 (CN) .......................... 2011 2 0313955

(51) Int. Cl.
*G02F 1/1343* (2006.01)
(52) U.S. Cl.
CPC ........ *G02F 1/134309* (2013.01); *G02F 1/1343* (2013.01); *G02F 1/134363* (2013.01); *G02F 2001/134318* (2013.01); *G02F 2001/134372* (2013.01)
(58) Field of Classification Search
CPC ............... G02F 1/134363; G02F 2001/134372

USPC .......................................................... 349/141
See application file for complete search history.

(56) References Cited

U.S. PATENT DOCUMENTS

| 6,583,840 | B1 | 6/2003 | Inoue et al. |
| 6,977,706 | B2 * | 12/2005 | Wu et al. ........................ 349/141 |
| 7,755,723 | B2 * | 7/2010 | Ino ................................. 349/114 |
| 8,654,292 | B2 * | 2/2014 | Kubota et al. .................. 349/138 |
| 2009/0284707 | A1 | 11/2009 | Cho et al. |

FOREIGN PATENT DOCUMENTS

| CN | 1276588 A | 12/2000 |
| CN | 101995707 A | 3/2011 |

(Continued)

OTHER PUBLICATIONS

International Search Report: dated Jun. 12, 2012; PCT/CN2012/080376.

(Continued)

*Primary Examiner* — Bumsuk Won
*Assistant Examiner* — Paisley L Arendt
(74) *Attorney, Agent, or Firm* — Ladas & Parry LLP

(57) ABSTRACT

An embodiment of the present invention discloses an array substrate comprising: a base substrate; a common electrode layer formed on the base substrate; a protective layer formed on the common electrode layer; and pixel electrodes formed onto the protective layer, wherein the base substrate is formed thereon with a plurality of protrusions parallel to each other, the common electrode layer is overcoated onto the protrusions, portions of the common electrode layer covering the protrusions are formed as protrusion electrode parts, and the pixel electrode comprises portions arranged alternately with the protrusion electrode parts. The embodiment of present invention also provides a liquid crystal panel comprising the above array substrate, as well as a liquid crystal display device.

10 Claims, 7 Drawing Sheets

(56) References Cited

FOREIGN PATENT DOCUMENTS

| | | |
|---|---|---|
| CN | 202210200 U | 5/2012 |
| JP | 08-286211 A | 11/1996 |

OTHER PUBLICATIONS

International Preliminary Report on Patentability dated Feb. 25, 2014; PCT/CN2012/080376.

* cited by examiner

ARRAY SUBSTRATE, LIQUID CRYSTAL PANEL AND LIQUID CRYSTAL DISPLAY DEVICE COMPRISING PROTRUSION ELECTRODE PARTS

TECHNICAL FIELD

Embodiments of present invention relate to an array substrate and a liquid crystal panel comprising the array substrate, as well as a liquid crystal display device.

BACKGROUND

Transmittance and refresh rate are important indexes for liquid crystal displays. Transmittance refers to the amount of the backlight after passing through a liquid crystal panel, and refresh rate refers to the frequency for liquid crystal charging. The increasing of the transmittance can improve the brightness of a display, and reduce costs. The increasing of refresh rate can improve the quality of dynamic images, depress tailing and reduce costs.

Current techniques of wide viewing angle horizontal electric field comprise IPS (In-Plane-Switching) and FFS (Fringe Field Switching). IPS has an adverse impact on transmittance because a metallic material is used for the pixel electrodes in an array substrate; and FFS cannot meet the developing market requirement, since the storage capacitance is so large that the refresh rate can only reach up to 120 Hz.

An array substrate of a conventional FFS structure comprises a common electrode layer 5', a pixel electrode 2', a glass substrate 3' and a protective layer 10'. Voltage difference is applied across the common electrode layer 5' and the pixel electrode 2', generating an electric field 4', but the electric field 4' does not comprise a horizontal electric field component, which gives rise to an insufficient driving force for driving liquid crystal molecules above the pixel electrode 2'. Therefore, a higher arrangement density is necessary for the pixel electrodes so as to remedy the defect of insufficient driving force for the liquid crystal molecules. However, if the arrangement density for the pixel electrodes is increased, the transmittance will be reduced.

In the aspect of structural design, the controlling force of the electric field acting on liquid crystal determines the transmittance of the liquid crystal. Generally, the electrodes are greater than 3 μm in width. The electric field always performs control on the liquid crystal molecules generally at edges of electrodes, whereas the portions over the electrodes tend to be the positions where the electric field force is the weakest and accordingly the liquid crystal molecules have low transmittance, which causes an overall reduction of the transmittance. The same problem also happens to the FFS configuration. Although a transparent ITO (Indium Tin Oxide) material is employed for the pixel electrodes, the overall transmittance is adversely impacted as the transmittance of the liquid crystal above the pixel electrodes is not high. While in FFS configuration, the pixel electrodes will create greater storage capacitance with the lower common electrodes, which on one hand benefits the stabilizing of the pixel voltage, and on the other hand, the FFS configuration shows significant insufficiency in its application during recent years, and as more and more products call for high refresh rate. 3D techniques, integration technology and so on require support from a higher refresh rate; while greater storage capacitance causes a longer charging period for the pixels in FFS configuration, leaving a decreased refresh rate.

SUMMARY

One of the technical problems which the present invention is intended to resolve is how to improve the frame refresh rate of a liquid crystal panel; and another one is how to improve transmittance of a liquid crystal panel.

One aspect of the present invention provides an array substrate, comprising: a base substrate; a common electrode layer formed on the base substrate; a protective layer formed on the common electrode layer; and pixel electrodes formed onto the protective layer, wherein the base substrate is formed thereon with a plurality of protrusions parallel to each other, the common electrode layer is overcoated onto the protrusions, portions of the common electrode layer covering the protrusions are formed as protrusion electrode parts, and the pixel electrode comprises portions arranged alternately with the protrusion electrode parts. For example, a material for the protective layer is an insulating resin.

For example, the common electrode layer and the pixel electrodes are made of a transparent conduction material.

For example, the transparent conduction material is ITO or IZO.

For example, the protrusions are in a triangular, trapezoid, semi-circular or semi-ellipse shape.

For example, the pixel electrodes comprise a plurality of slits parallel to each other, which corresponding to the plurality of protrusions such that the portions of the pixel electrodes between the slits are arranged alternately with the protrusions. For example, the slits of the pixel electrode are closed.

For example, the slits of the pixel electrode are open at one end thereof.

For example, the top of the protrusion electrode part reaches substantially the same level as that of the pixel electrode.

Another aspect of the present invention also provides a liquid crystal panel comprising the above array substrate.

Still another aspect of the present invention also provides a liquid crystal display device comprising the above liquid crystal panel.

With the configuration of the present invention, a plurality of protrusions are formed on a glass substrate, and the portions of the common electrode layer which are overcoated onto the protrusions are formed as protrusion electrode parts, such that horizontal component of the electric field can be increased and thus arrangement density of the second electrodes can be decreased, resulting in depressed storage capacitance and an improved refresh rate in pixels.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

The objects, solutions and advantages of the embodiments of present invention will be more apparent from the following clear and complete description about the embodiments of present invention in connection with embodiments and accompany drawings. Obviously, the described embodiments are merely part of the embodiments of the present invention, but not all the embodiments. Based on the described embodiments of present invention, all the other embodiments achieved by the ordinary skilled in this art without any creative work belong to the protective scope of the present invention.

An array substrate according to an embodiment of the present invention includes a plurality of gate lines and a plurality of data lines which intersect each other and thus defining pixel units arranged in a matrix. Each of the pixel units comprises a thin film transistor working as a switching element as well as a pixel electrode and a common electrode for controlling orientation of liquid crystal. In each pixel unit, the gate electrode of the thin film transistor is electrically connected to or integrally formed with a corresponding gate line, the source electrode thereof is electrically connected to or integrally formed with a corresponding data line, and the drain electrode thereof is electrically connected to or integrally formed with the corresponding pixel electrode. The common electrode is connected with a common electrode line. The following description is mainly made with regard to one or more pixel units, while the other pixel units can be formed equally.

Embodiment 1

Figure 7:
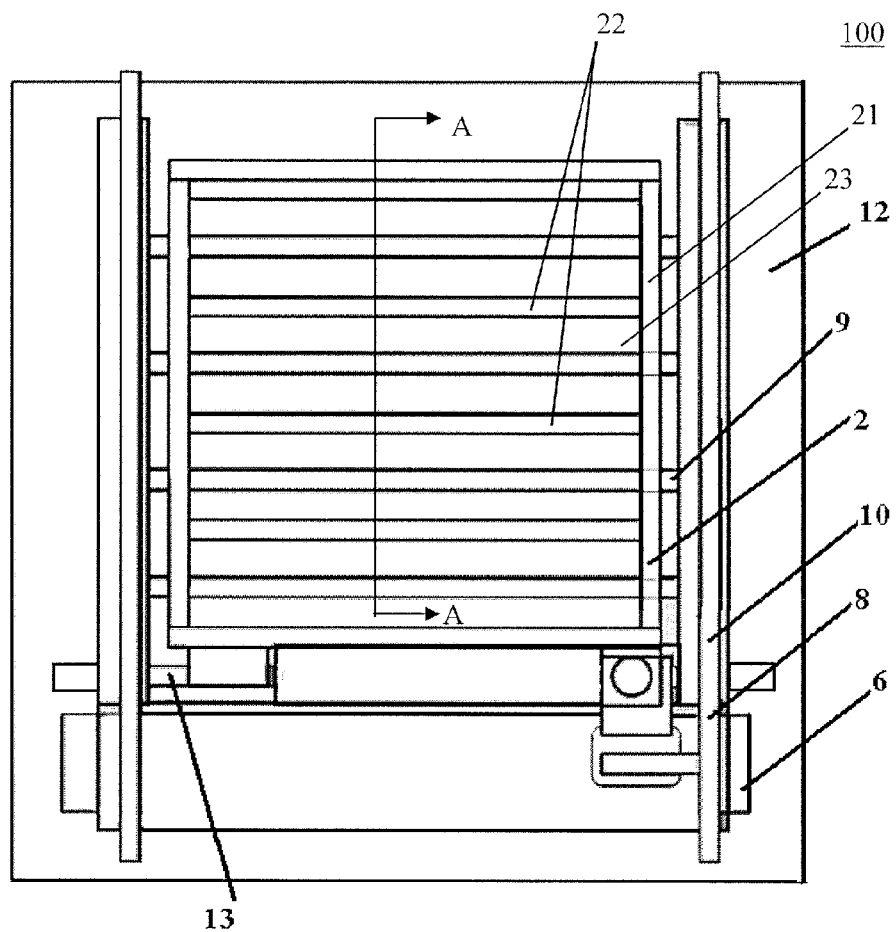
Figure 8:
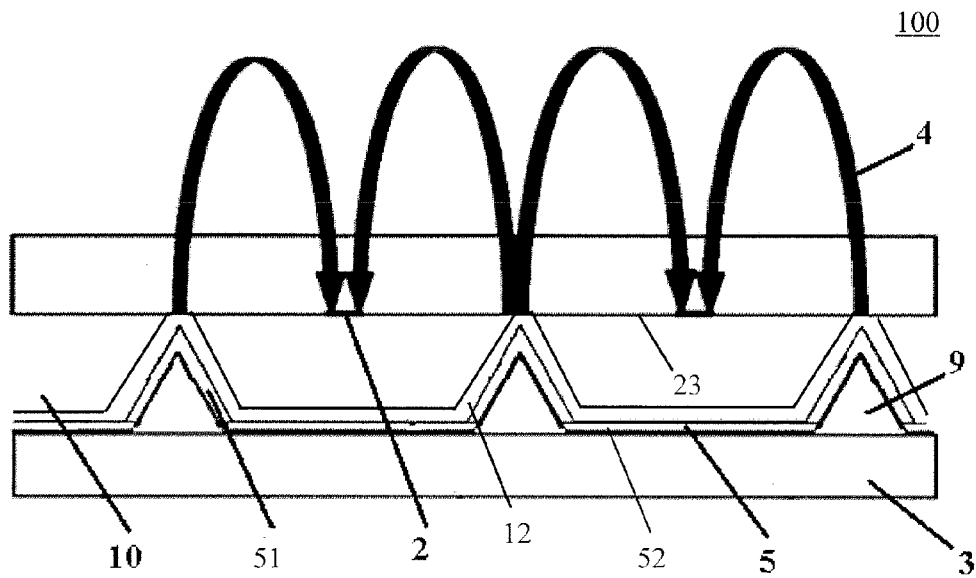
FIG. 8 is a structural schematic view of a first embodiment of the present invention, showing an electric field in the operating state thereof.

FIG. 7 is a plan view showing one pixel unit of the array substrate of the embodiment 1; FIG. 8 is a cutaway view along the line A-A in FIG. 7.

As shown in FIGS. 7 and 8, the array substrate 100 of this embodiment comprises a glass substrate 3, a common electrode layer 5, an insulating layer 12, a protective layer 10 and a plurality of pixel electrodes 2 formed on the protective layer 10. The surface of the glass substrate 3 is formed thereon with a plurality of protrusions 9. The common electrode layer 5 overlaps the protrusions 9 and the glass substrate 3; the common electrode layer 5 comprises protrusion electrode parts 51 covering the protrusions 9 and flat electrode parts 52 located at the flat portions between the protrusions 9. The pixel electrodes 2 are arranged above the common electrode layer 5, comprising portions arranged alternately with the protrusion electrode parts 51. In this embodiment, the top of the protrusion electrode part 51 reaches the same level as the pixel electrodes 2. The insulating layer 12 is formed on the common electrode layer 5 for separating the common electrode layer 5 from the data lines. The protective layer 10 is formed on the insulating layer 12 to fill the portions between the protrusions 9, thus the upper surface thereof is approximately flat. The pixel electrodes 2 are formed onto the upper surface of the protective layer 10.

The glass substrate 3 is one example of a base substrate, and can be replaced by for example, a quartz substrate, a plastic substrate, etc.

Both the common electrode layer 5 and the pixel electrodes 2 are made of a transparent conduction material. The examples for the transparent conduction material comprise indium tin oxide (ITO) or indium zinc oxide (IZO).

The common electrode layer 5 is plate-shaped as a whole, and comprises a plurality of protrusion electrode parts 51 parallel to each other; the pixel electrode 2 is plate-shaped as a whole, and comprises two stem portions 21 and a plurality of connection parts 22 located between the two stem portions 21, and slits 23 are formed between the connection parts 22 so as to be parallel to each other and correspond to protrusions 9. That is, the connection parts 22 are located between the slits 23, and when viewed along the direction of the thickness of the array substrate 100, the protrusion electrode parts 51 of the common electrode layer 5 are located within the slits 23, such that the plurality of protrusion electrode parts 51 of the common electrode layer 5 are arranged to be alternate with the plurality of connection parts 23 of the pixel electrodes 2.

In this embodiment, the slits 23 are all closed. In another example, the slits of the pixel electrode 2 may be open at one end thereof, and correspondingly, the pixel electrode 2 comprises one stem portion and a plurality of connection parts 22 extending from the stem electrode part toward one side, that is, in a honeycomb form.

The array substrate 100 also comprises a common electrode line 13, and the common electrode layer 5 is connected to the common electrode line 13 through a via hole. As pixel electrode 2 is connected with the drain electrode of the thin film transistor (TFT) through a via hole, the source electrode of the TFT connects with a data line 8.

In this embodiment, the protective layer 10 employs resin materials (and possible SiNx material, etc as well); the protrusions 9 have a triangular shape in section, and formed of an insulating material. The insulating layer 12 may also be formed with a resin material, that is, for example, a resin layer.

It's also shown, in FIG. 8, that the horizontal component of electric field is created between the protrusion electrode parts 51 and the pixel electrodes 2 for driving liquid crystal molecules. Due to the protrusion electrode parts 51 formed in the common electrode layer 5, the liquid crystal molecules above the protrusion electrode parts 51 are greatly controlled to such an extent that the transmittance of the array substrate is improved.

Embodiment 2

Figure 9:
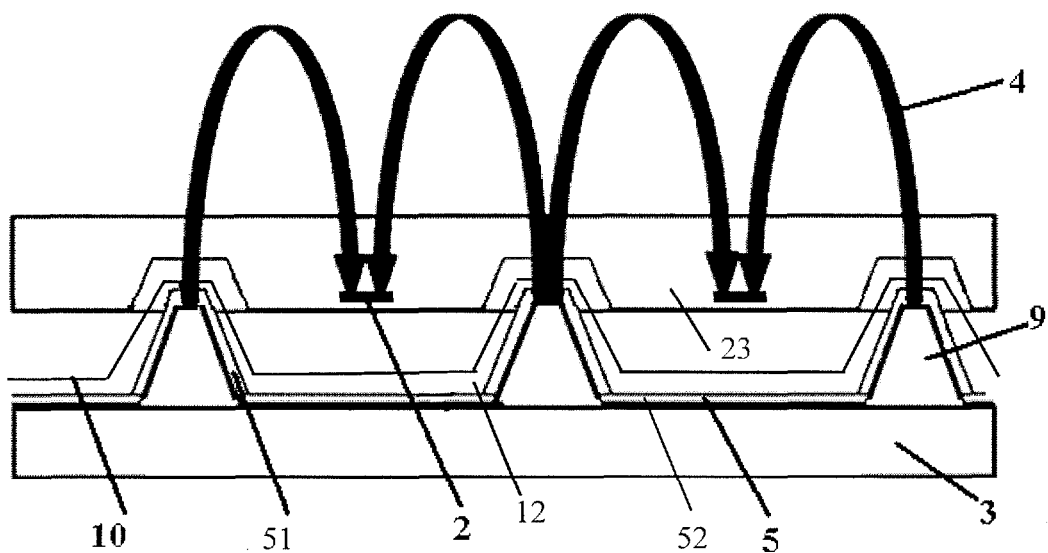
FIG. 9 is a structural schematic view of a second embodiment of the present invention, showing an electric field in the operating state thereof.

As shown in FIG. 9, the configuration of this embodiment 2 is essentially same as that of the embodiment 1, and the difference is that the cross-section shape of the protrusions 9 formed on the base substrate 3 and parallel to each other is trapezoid.

The cross-section shape of the protrusions 9 is not limited to triangle and trapezoid, but also may be semi-circular, semi-ellipse, and so on.

Embodiment 3

The example 3 provides a method for forming the array substrate of the embodiment 1 or 2. As shown in FIGS. 2 to 7, the technology for manufacturing the array substrate of the embodiments 1 and 2 may for example include steps as follows.

1. Preparing a glass substrate serving as the base substrate, then forming a conduction material layer on the glass substrate by using for example sputtering, and then forming gate lines 6 and common electrode lines 13 on the glass substrate by using a photolithographic process comprising photoresist coating, exposing, etching, photoresist removing and the like. For example, a metal conduction material, such as Al, Cu, or the like, is employed for the conduction material. The resultant configuration is shown in the plan view of FIG. 2.

2. For example, forming an insulating layer by using sputtering, then forming a gate insulating layer 11 and a plurality of protrusions 9 parallel to each other, based on the step 1, by using a photolithographic process including photoresist coating, exposing, etching, photoresist removing, etc. The cross-section of protrusions 9 is triangle, trapezoid, semi-circular, semi-ellipse, and so on. The resultant configuration is shown in the plan view of FIG. 3.

3. For example, forming a transparency conducting layer by using sputtering, then forming a common electrode layer 5, based on step 2, by using a photolithographic process including photoresist coating, exposing, etching, photoresist removing etc. The thus formed common electrode layer 5 comprises a plurality of protrusion electrode parts 51 corresponding to the protrusions 9 and flat electrode parts 52 located between the protrusion electrode parts 51. The examples of the transparent conduction material include ITO and so on. The resultant configuration is shown in the plan view of FIG. 4.

Figure 1:
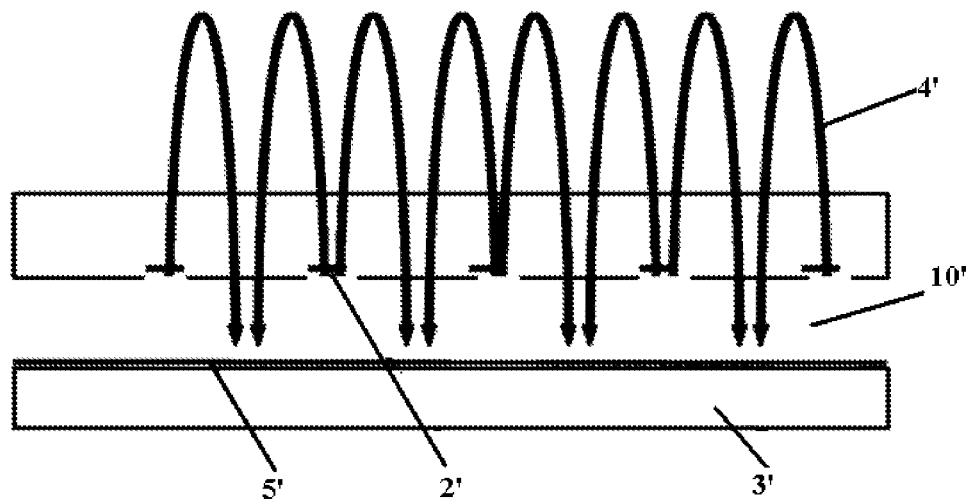
FIG. 1 is a schematic view of a conventional FFS structural array substrate, showing the schematic view for the distribution of the electric field in the operating state thereof.
Figure 2:
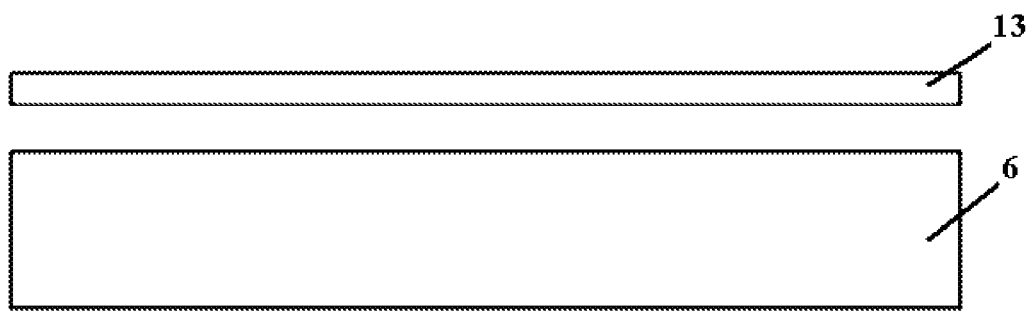
FIGS. 2 to 7 are schematic plan views of individual processing steps during the formation procedure of the array substrate according to an embodiment of the present invention.
Figure 3:
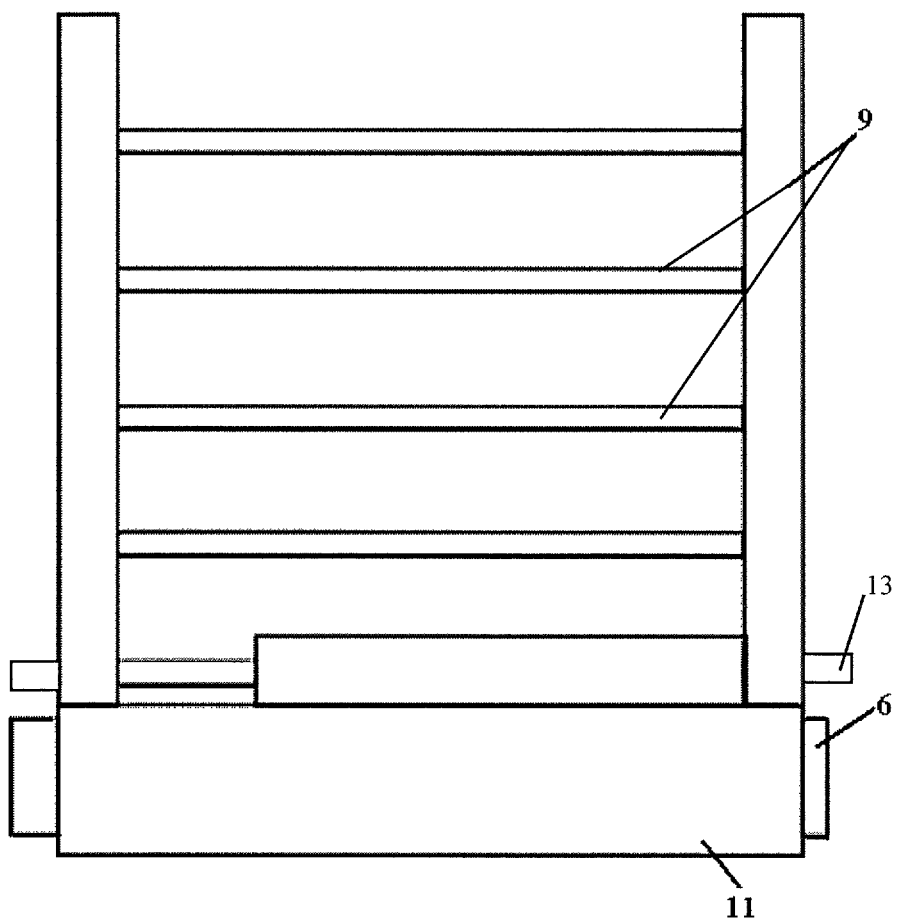
Figure 4:
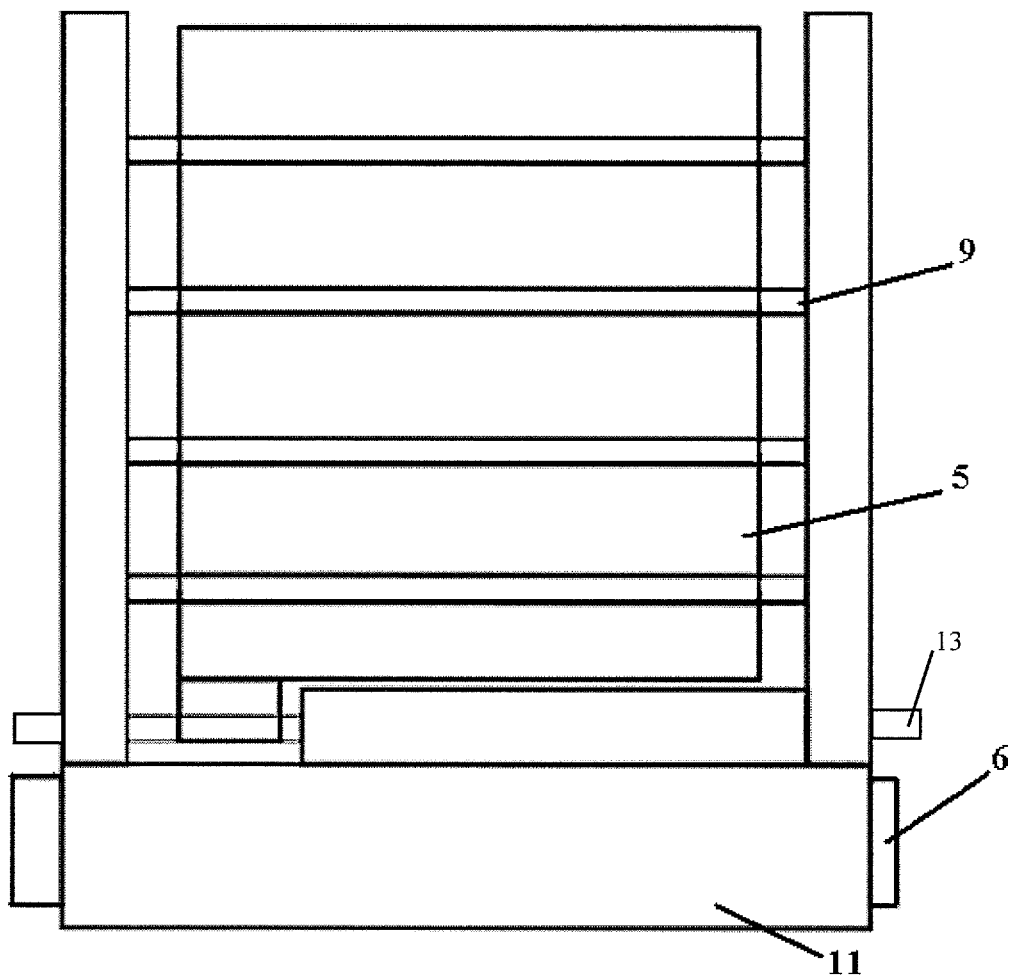
Figure 5:
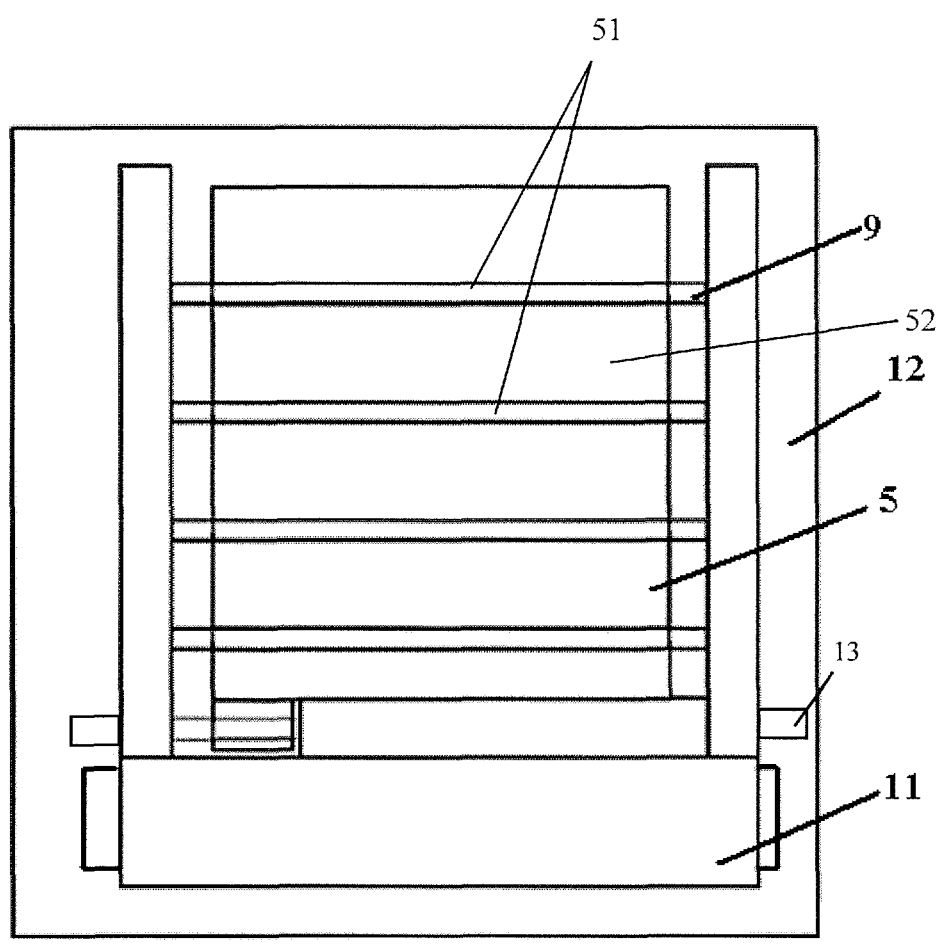
Figure 6:
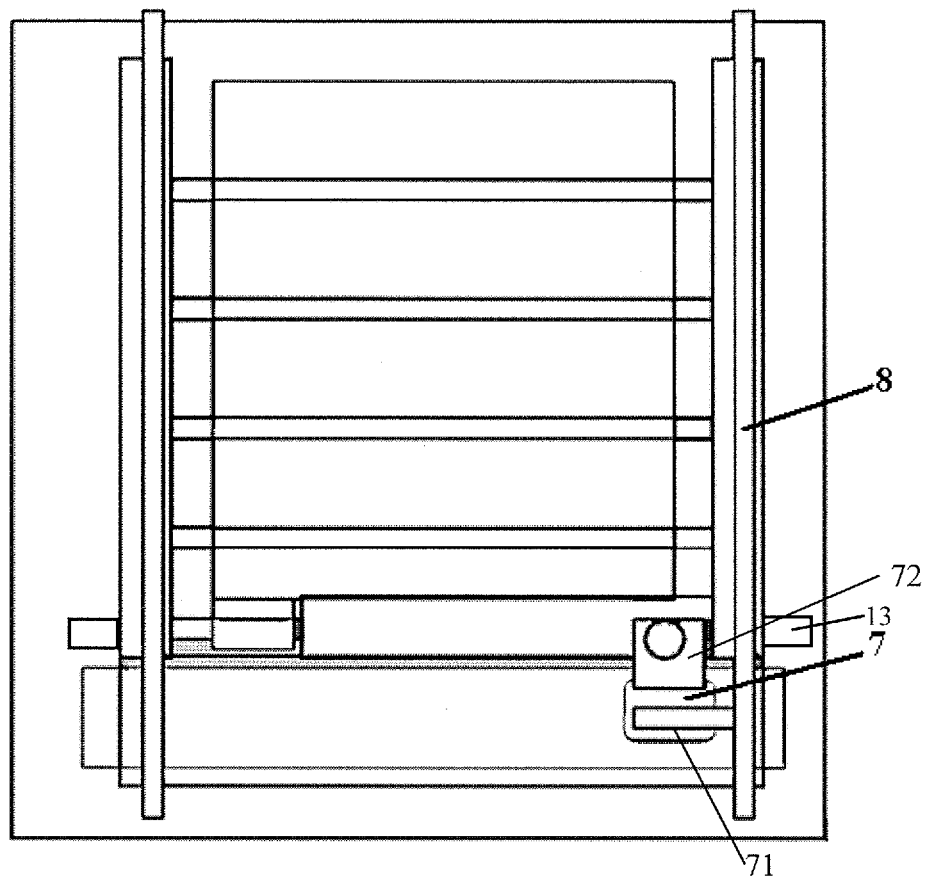

4. Forming a resin layer 12, based on step 3, as an insulating layer. The material for the resin layer 12 is an insulating material, as shown in FIG. 4. The resin layer 12 is used to separate the common electrode layer 5 from the subsequently formed data lines.

5. Forming a semiconductor layer by using for example sputtering, and then forming an active layer 7 of a thin film transistor, based on step 4, by using a photolithographic process including exposing, etching, ashing, photoresist removing, etc, and the active layer 7 being arranged over a portion of each gate line 6 via the insulating layer 11; next, depositing for example a conducting layer, and then forming source electrodes 71, drain electrodes 72 and data lines 8 separated from each other by using a photolithographic processes including exposing, etching, ashing, photoresist removing, etc, the data line 8 and source electrode 71 being formed integrally. A metal conduction material, such as Al, Cu, and the like, is employed for the conduction material of source and drain electrodes and data lines 8. The resultant configuration is shown in the plan view of FIG. 5.

The active layer 7, the portion of a gate line 6 acting as a gate electrode, the gate insulating layer 11, a source electrode 71, a drain electrode 72 together constitute a thin film transistor (TFT), acting as a switching element of the pixel unit.

6. Forming a protective layer 10, and then forming protective layer via holes in the protective layer 10 and over the drain electrodes 72 by using a photolithographic processes including photoresist coating, exposing, photoresist removing, etc. The material for protective layer 10 may be an inorganic insulating material or an organic insulating material.

7. Forming a transparency conducting layer by sputtering, for example, and then forming pixel electrodes 2, based on step 6, by using a photolithographic process including photoresist coating, exposing, etching, photoresist removing, etc. The pixel electrodes 2 comprises two stem portions 21 parallel to each other and a plurality of connection parts 22 located between the stem portions 21, and slits 23 formed between the connection parts 22. The pixel electrodes 2 are electrically connected to the drain electrodes of the thin film transistors through the protective layer via holes. The resultant configuration is shown in the plan view of FIG. 6.

Thus, the array substrate according to embodiment 1 or 2 is achieved.

The common electrode layer 5 and the common electrode lines 13 may be electrically connected to each other through external connection. The common electrode lines 13 are used, for example, to overlap with the pixel electrodes so as to generate storage capacitance to improve data retention effect.

Embodiment 4

The embodiment 3 the of present invention further provides a liquid crystal panel comprising the array substrate described above. Also, the liquid crystal panel may comprise an opposite substrate in addition to the above array substrate, and the liquid crystal layer is interposed between the array substrate and the opposite substrate. The opposite substrate can comprise a color filter layer.

The liquid crystal panel constitutes liquid crystal display device together with a backlight unit, a driver circuit, etc, and can be used for the display devices of a cell phone, a computer, a television, and so on. From the above embodiments, compared with the existing IPS and FFS techniques, because the horizontal component of electric field generated after powering on increase the driving force for liquid crystal, the pixel configuration of the embodiments of present invention can improve transmittance of a panel such that the transmittance is higher than that of the IPS configuration, and furthermore, can reduce pixel storage capacitance by 50% or more with respect to the FFS configuration and accordingly improves charging capacity and thus frame refresh rate remarkably. With the improvement of charging capacity, it's possible to use a refresh rate at 180 Hz or even 240 Hz in an FFS configuration. The above embodiments are merely for the purpose of the illustration of the present invention, but not the limitation of the present invention, it's obviously that various alternation and modification can be made by the ordinary skilled in this art without departing from the spirit and scope of the present invention, and therefore, all the equal technical solutions are encompassed by the present invention, and the scope of patent protection scope should be defined by the appended claims.

The invention claimed is:

1. An array substrate comprising:
a base substrate;
a common electrode layer formed on the base substrate;
a protective layer formed on the common electrode layer, wherein an upper surface of the protective layer opposite the common electrode is substantially flat; and
a pixel electrode formed onto the upper surface of the protective layer,
wherein the base substrate is formed with a plurality of protrusions thereon, the protrusions of a strip shape and extending parallel to each other, and a space between adjacent protrusions is filled with the protective layer,
wherein the common electrode layer is overcoated onto the protrusions, portions of the common electrode layer covering the protrusions are formed as protrusion electrode parts, portions of the common electrode layer between adjacent protrusions are formed as flat electrode parts that are formed integrally with the protrusion electrode parts,
wherein the pixel electrode comprises portions that are in a plane parallel to the base substrate and arranged alternately with the protrusion electrode parts; and
wherein the protrusion electrode parts each comprises a top that is substantially coplanar to the portions of the pixel electrode.

2. The array substrate according to claim 1, wherein a material for the protective layer is an insulating resin.

3. The array substrate according to claim 1, wherein the common electrode layer and the pixel electrode are made of a transparent conduction material.

4. The array substrate according to claim 3, wherein the transparent conduction material is ITO or IZO.

5. The array substrate according to claim 1, wherein the protrusions are in a triangle shape.

6. The array substrate according to claim 1, wherein the pixel electrode comprises a plurality of slits parallel to each other, which correspond to the plurality of protrusions, and the portions of the pixel electrode between the slits are arranged alternately with the protrusions.

7. The array substrate according to claim 6, wherein the slits of the pixel electrode are closed.

8. The array substrate according to claim 6, wherein the slits of the pixel electrode are open at one end thereof.

9. A liquid crystal panel comprising the array substrate according to claim 1.

10. A liquid crystal display device comprising the liquid crystal panel according to claim 9.

* * * * *